Dec. 15, 1942.　　　C. H. AYARS　　　2,305,510
RECEPTACLE FILLING MACHINE
Filed Aug. 24, 1939　　　4 Sheets-Sheet 1
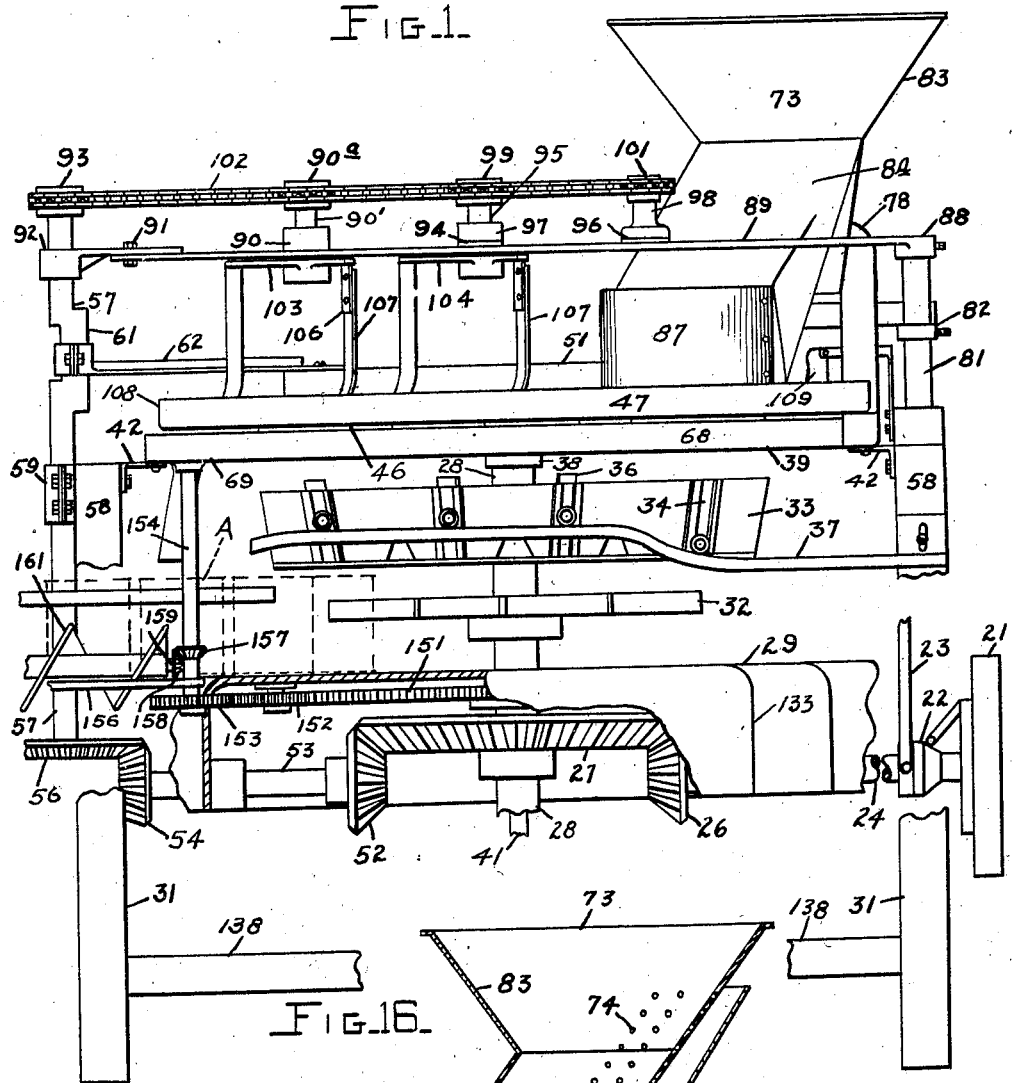
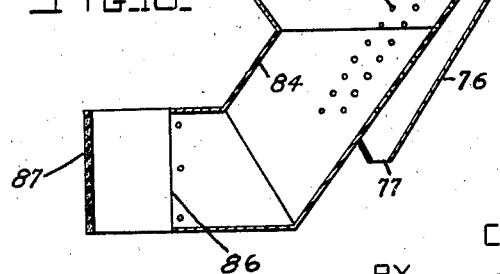
INVENTOR
CHARLES H. AYARS
BY
ATTORNEY Dec. 15, 1942.  C. H. AYARS  2,305,510
RECEPTACLE FILLING MACHINE
Filed Aug. 24, 1939   4 Sheets-Sheet 2
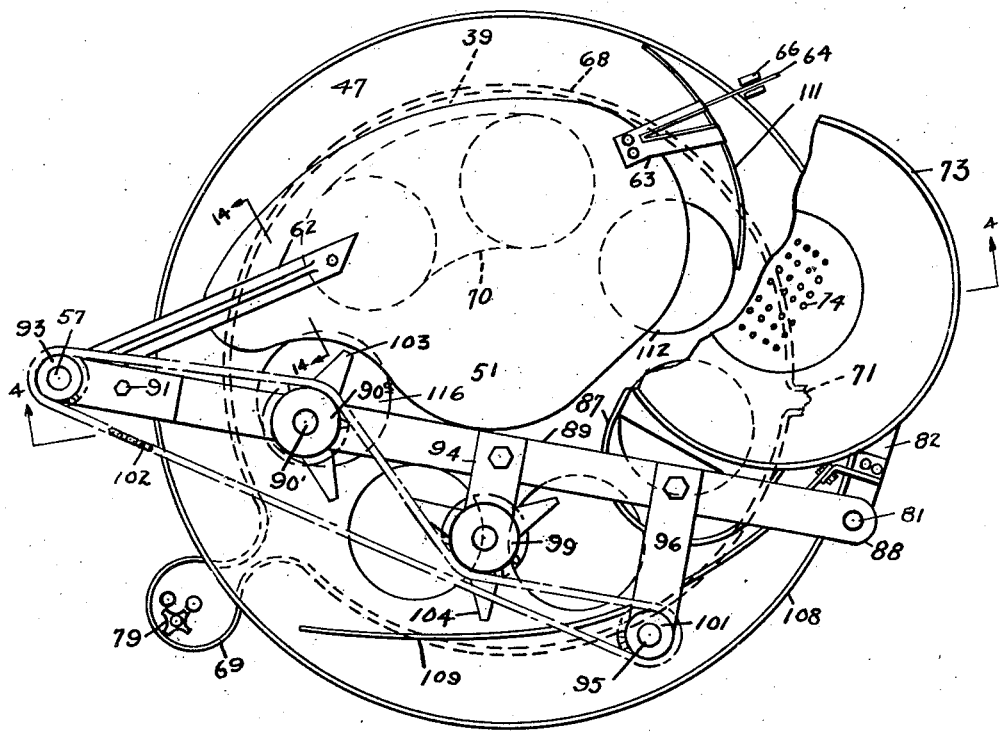
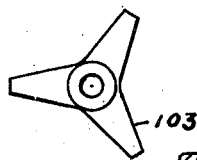
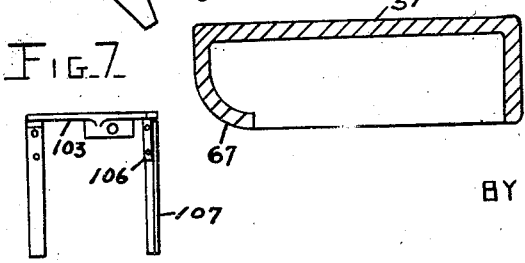
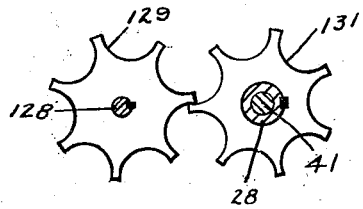
INVENTOR
CHARLES H. AYARS
BY
ATTORNEY Dec. 15, 1942.  C. H. AYARS  2,305,510
RECEPTACLE FILLING MACHINE
Filed Aug. 24, 1939  4 Sheets-Sheet 3
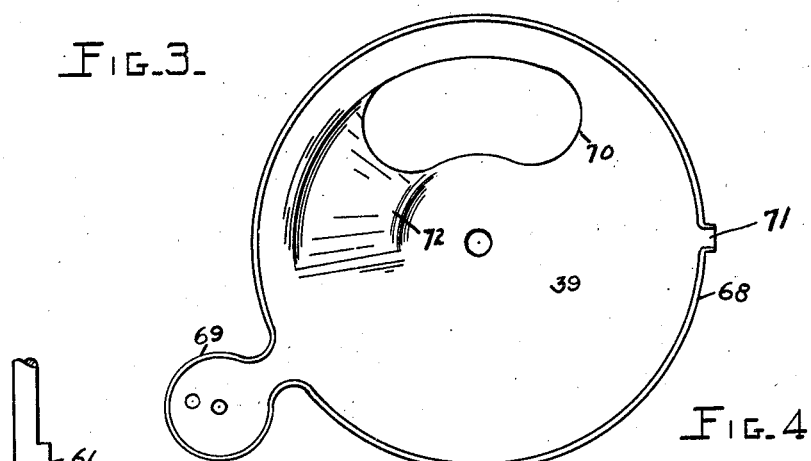
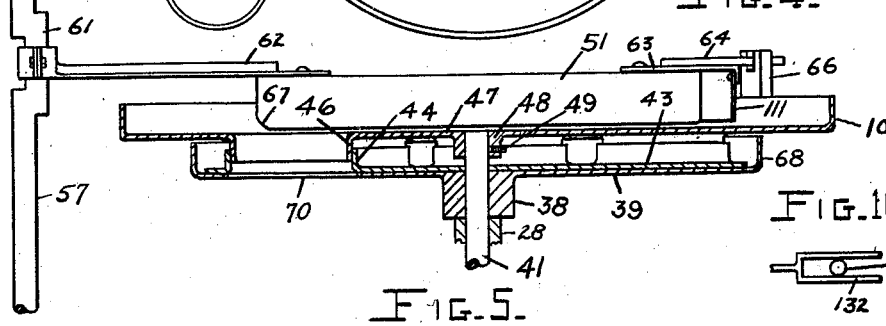
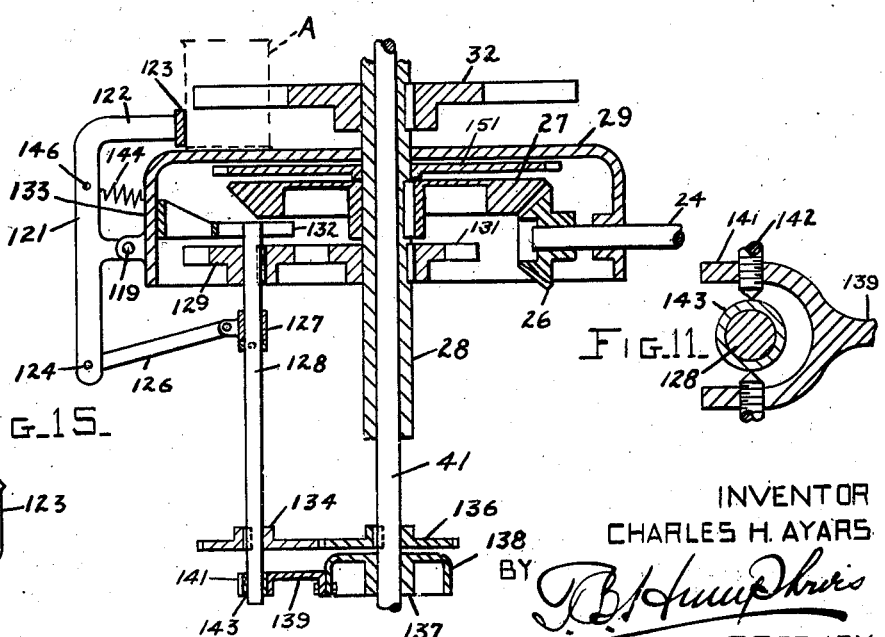
INVENTOR
CHARLES H. AYARS
BY
ATTORNEY Dec. 15, 1942.  C. H. AYARS  2,305,510
RECEPTACLE FILLING MACHINE
Filed Aug. 24, 1939   4 Sheets-Sheet 4
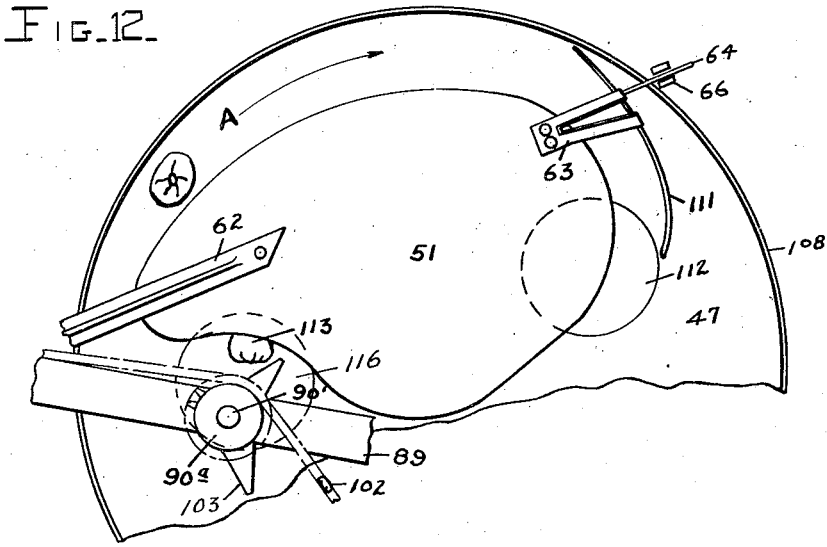
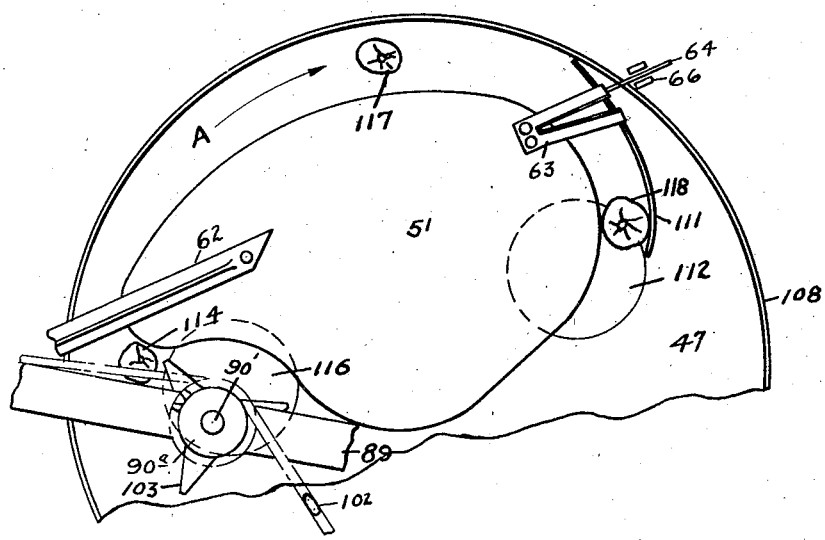
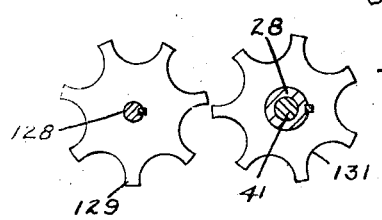
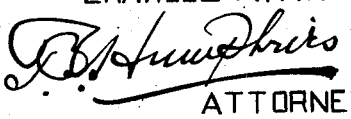
INVENTOR
CHARLES H. AYARS
BY
ATTORNEY Patented Dec. 15, 1942

2,305,510

UNITED STATES PATENT OFFICE 2,305,510

RECEPTACLE FILLING MACHINE

Charles H. Ayars, Salem, N. J., assignor to Ayars Machine Company, Salem, N. J., a corporation of New Jersey Application August 24, 1939, Serial No. 291,647

13 Claims. (Cl. 226—97)

This invention relates to machines for filling receptacles with liquid and pulpous matter, such as tomatoes and the like, and refers particularly to such a machine so designed that whole pulpous objects will not be crushed.

The object of the invention is to provide a machine which will automatically fill a predetermined quantity of material, such as tomatoes, into receptacles, and will prevent the crushing or smashing of whole objects, such as a whole tomato, and which will remove such objects from overfilled measuring cups and direct the same into empty measuring cups.

A further object of the invention is to provide means operated by the container itself for insuring the filling of said container, and which in the absence of said container will make no deposit of material.

A still further object of the invention is to provide a receptacle filling machine in which the receptacles themselves are substantially filled with whole and uncrushed objects and liquid.

A still further object of the invention is to provide a machine in which the material to be filled into the receptacle is retarded and confined to a position below the hopper.

According to the invention, the receptacle filling machine comprises a hopper for the material to be deposited into the receptacles, means for withdrawing part of the liquid from said material and depositing the same in a supply tank, means for supplying the containers to be filled with a predetermined quantity of said liquid, a measuring device for measuring quantities of material to be deposited into receptacles, a flexible guard at the bottom of said hopper confining the material being deposited into the measuring cups, means for wiping whole objects from the top of the measuring cups, and means for directing the object so removed into empty measuring cups.

The machine may be provided with means actuated by the receptacle for insuring the filling of that receptacle whereby upon the absence of a receptacle no material will be deposited.

The machine is an improvement on the can filling machine shown and described in my United States Letters Patent No. 2,061,644, granted November 24, 1936.

The drawings illustrate an embodiment of the invention and the views therein are as follows:

Figure 1 is a side elevation of the machine with parts broken away,

Figure 2 is a top plan view,

Figure 3 is a top plan view of the discharging and sealing plate,

Figure 4 is a cross-sectional view taken on the line 4—4 of Figure 2,

Figure 5 is a vertical sectional view showing the "no can-no fill" mechanism,

Figure 6 is a top plan view of one of the rotary leveling members,

Figure 7 is a front elevation of the same,

Figure 8 is a view showing the star wheel engagement for revolving the turret operating shaft, Figure 9 shows the star wheel fingers disengaged which will be their position during the absence of a receptacle, Figure 10 is a small detail view showing the forked bearing for permitting the star wheels of Figure 8 to be disengaged, Figure 11 is an enlarged detail view of the pivot bearing for the shaft carrying the movable star wheel of Figure 8, Figure 12 is a fragmentary top plan view of the machine showing the mounting of the agitator and the action of one of the levelers on an overloaded measuring pocket, Figure 13 is a like view showing the parts in different relation, Figure 14 is a vertical sectional view of the agitator taken on the line 14—14 of Figure 2, Figure 15 is a top plan view of the upper arm of the bell crank which engages the receptacle to mesh the star wheels shown in Figures 8 and 9, and Figure 16 is a vertical sectional view of the hopper.

As illustrated in the drawings, the machine is provided with a pulley 21 and with clutch mechanism 22 operated through a shipper handle 23 for connecting said pulley with the shaft 24. This shaft is provided on its inner end with a bevel pinion 26 meshing with a bevel gear 27 mounted on the main hollow shaft 28. This hollow shaft extends through the table 29 of the machine which is supported on standards 31 and has a star wheel 32 affixed thereto.

Above the star wheel 32 is a funnel casting 33 provided with raceways 34 in which plunger members 36 operate. The roller members of these plungers 36 operate on a track 37. This type of plunger is substantially the same as that found in my United States Letters Patent No. 1,459,492, granted June 19, 1923.

The hollow shaft 28 extends above this funnel casting, and its end forms a thrust bearing for the hub 38 of a sealing and discharge plate 39 which is mounted on the internal shaft 41, but held against rotation therewith by the connecting link 42, (see Figure 1). Resting on the discharging and sealing plate 39 is a bottom turret 43 of the measuring device. This turret has a circle of upstanding ring flanges 44 into which fit the downwardly extending ring flanges 46 of an upper turret member 47. This upper turret member has a hub 48 secured to the internal shaft 41 by the set screw 49. An agitator 51 extends above the upper turret member 47, and the shape of this member can be better understood by referring to Figures 2, 12, 13 and 14.

The bevel gear 27 drives a pinion 52 on a stub shaft 53 (see Fig. 1) while the other end of this stub shaft is provided with a bevel pinion 54 meshing with a bevel gear 56 at the bottom of a shaft 57. This shaft is supported on the machine frame 58 in a bearing 59. The shaft is provided with a crank 61 while an arm 62 having one end secured to the agitator 51 engages said crank in order to oscillate said vibrator. The other end of said vibrator is provided with a bracket 63 having an extension 64 operating in a slotted guide 66 secured to the machine frame (not shown).

The concave forward part of the agitator where the same operates above the filled pockets formed by the turret members 43 and 47 has a rounded bottom face 67 (see Figure 14). The sealing and discharge plate 39 is provided with an upstanding flange 68 which includes a juice supply pot 69 and an inlet 71 later explained. The plate has an arcuate depression 72 leading to the discharge opening 70. This feature is the subject-matter of my United States Letters Patent No. 2,104,445, granted January 4, 1938, and permits the contents of the measuring cups or pockets to drop slightly when coming in contact with the agitator.

The hopper 73 has a perforated part 74 and a rear wall 76 having a bottom outlet 77 connecting the casting 78 which leads through said opening 71 to the sealing and discharge plate 39. The juice which drains through the perforations 74 and onto the sealing and discharge plate 39 will be confined to a circumferential trough on said plate formed by the lower turret 43 and will find its way into the pot 69 which is provided with valve means 79. This valve mechanism may be substantially the same as that shown in Figures 3 and 4 of my United States Letters Patent No. 2,158,767, granted May 16, 1939.

Mounted on the frame is a stationary shaft 81 which has a bracket 82 for holding the hopper 73 in position. This hopper has an upper bell end 83, an oblique chute 84 and a vertical outlet 86. The outlet is substantially rectangular and to its side walls are fastened the ends of an arcuate strip of flexible material 87 (see Fig. 2). Above the bracket 82 on the shaft 81 is a connecting lug 88 of a bearing bracket 89. The other end of this bracket is fastened at 91 to a bracket 92 on the shaft 57. The shaft 57 is freely rotatable in the bracket 92, and its upper end is provided with a sprocket 93. Intermediate the ends of this bracket 89 is a bearing 90 having a shaft 90' and a sprocket 90ª located at the upper end thereof. Extensions 94 and 96 are provided on the bracket 89, and these extensions are provided with bearings 97 and 98 respectively each having shafts 95 and 95' which in turn have sprockets 99 and 101 respectively on their upper ends. 102 represents a sprocket chain which engages the sprockets 90ª, 99 and 101, as shown in Figure 2 of the drawings. Mounted on the lower end of the shafts 90' and 95 are supports 103 and 104 having downwardly extending fingers 106. These fingers have attached thereto flexible depending fingers 107 which extend into the upper turret member 47 with their ends adapted to contact the contents of the filled telescopic cups.

The operation of these flexible fingers can be better described in connection with Figures 12 and 13. Upon the operation of the machine, the tomatoes or the like will pass downward to the discharge end 86 of the funnel or hopper 73 and bear against the flexible guard 87. Considering that a telescopic cup is always just beneath the discharge end of the hopper some whole tomatoes or the like will push the flexible guard 87 upward and pass outward therefrom. These whole tomatoes or the like riding on top of the contents of the filled pocket may first come in contact with the flexible fingers on the support 104 which may brush them against the guide 109 from whence they will roll or move against the upright flange 108 on the upper turret member. These fingers will also settle the contents of the cups to completely fill same without voids.

If tomatoes or the like continue to ride above the pockets, just at the moment they are about to pass under the agitator, the flexible fingers 107 on the support 103 will engage same, as shown in Figure 12, and brush the same outward against the peripheral flange 108 of the upper turret plate where they will be rolled in the direction of the arrow A until they strike against the guide 111 which will direct the same into an open pocket 112. A tomato 113 is shown being engaged by one of the flexible fingers of the support 103. It is shown at 114 after being brushed from the top of the measuring cup 116. It is also shown as lying upon the upper turret plate at 117, and at 118 it is shown engaging the guide 111 and about to follow into the open measuring cup 112.

The combined operation of the flexible guard 87 and flexible fingers 107 in combination with the guides 109 and 111 will insure the filling of the receptacles with at least four fairly large size tomatoes or five smaller ones, the balance of the receptacle being filled with pulp and juice.

The mechanism constituting the "no can-no fill" is as follows: Pivotally secured to the table 29 at 119 is a bell crank 121. The upper arm 122 is provided with a shoe 123 shaped as shown in Figure 15. The lower arm 124 of the bell crank has a link 126 connecting it with a loose bearing 127 mounted on the shaft 128. This shaft is provided with a star wheel 129 in line with a star wheel 131 mounted on the hollow shaft 28. The upper end of the shaft 128 extends into a forked bearing 132 (see Figure 10) and this bearing is mounted on the skirt 133 of the table. The shaft 128 is provided with a gear 134 meshing with a gear 136 on the internal solid shaft 41, which last-named shaft is journaled in a bearing 137 in the support casting 138 extending between the standards 31. This support casting 138 has a bracket 139 fastened thereto, and provided with forked arms 141 which carry adjustable needles 142 engaging a bearing 143 in which the shaft 128 rotates.

The bell crank has a spiral spring 144 fixed at one end at 146 while its other end is fastened to the skirt of the table 29. This spiral spring will urge the shoe 123 on the bell crank arm 122 inward. Considering that no receptacle is present at the position marked "A," the spring 144 will draw the shoe 123 inward while the bell crank arm 124 moving outward will pull the shaft 128 in its bearing 143 outward disengaging the fingers of the star wheels 129 and 131. If no can is present it will be readily seen that no material will be delivered from the measuring turret because the measuring turret is operated by the shaft 41 through the gears 136 and 134 on the shaft 128, and if the star wheel 129 for driving the shaft 128 is disconnected no rotation will be imparted to the shaft 41. Consequently, no material will be delivered as the turret members will not rotate.

When the can is present in the position shown in Figure 5, the bell crank 128 will be moved outward by virtue of the shoe 123 striking the cans, the bell crank arm 124 moved inward to move the shaft inward, and thus engage the fingers of the star wheels 129 and 131, so that upon the rotation of the star wheel 131 fixed to the continuously operating hollow shaft 28, the shaft 128 will be rotated, and will impart rotation to the shaft 41, thereby operating the turret members to deliver a charge of material through the discharge opening 70 in the discharge and sealing plate 39 to the funnel casting 33 from whence it will be delivered to the receptacle.

The hollow shaft 28 is provided with a gear 151 which meshes with an idler pinion 152 mounted under the table 29, and this idler pinion in turn meshes with a gear 153 on the end of a shaft 154 which is journaled in a table extension 156 and in sealing and discharge plate 39. This shaft is provided with a bevel pinion 157 meshing with a like pinion 158 on the inner end of the can feed shaft 159. This shaft drives the screw or worm 161 of the can feeding mechanism which said mechanism is substantially the same as that shown and described in my United States Letters Patents No. 2,061,644, granted November 24, 1936, and 2,158,767, granted May 16, 1939.

Of course, the receptacle filling machine illustrated and described herein may be modified and changed in various ways without departing from the invention herein set forth and hereafter claimed.

The invention is hereby claimed as follows:

1. A receptacle filling machine comprising a hopper for material to be packaged, a guard associated with the outlet of said hopper, measuring cups receiving material from said hopper, revolving fingers for settling the material in the cups and removing whole objects from the top thereof, means for directing the material from said filled cups into empty cups, and a plate sealing the bottoms of said cups during the filling and wiping operations and provided with a discharge opening for depositing material from said filled cups.

2. A receptacle filling machine comprising a hopper for material to be packaged, a flexible guard associated with the outlet of said hopper, measuring cups receiving material from said hopper, revolving fingers for settling the material in the cups and removing whole objects from the top thereof, means for directing the material from said filled cups into empty cups, and a plate sealing the bottoms of said cups during the filling and wiping operations and provided with a discharge opening for depositing material from said filled cups.

3. A receptacle filling machine comprising a hopper for material to be packaged, a guard associated with the outlet of said hopper, measuring cups receiving material from said hopper, revolving flexible fingers for settling the material in the cups and removing whole objects from the top thereof, means for directing the material from said filled cups into empty cups, and a plate sealing the bottoms of said cups during the filling and wiping operations and provided with a discharge opening for depositing material from said filled cups.

4. A receptacle filling machine comprising a hopper for material to be packaged, a guard associated with the outlet of said hopper, measuring cups receiving material from said hopper, revolving fingers for settling the material in the cups and removing whole objects from the top thereof, guides for directing the material from said filled cups into empty cups, and a plate sealing the bottoms of said cups during the filling and wiping operations and provided with a discharge opening for depositing material from said filled cups.

5. A receptacle filling machine comprising a hopper for material to be packaged, a main hollow shaft continuously rotating when said machine is in operation, means on said shaft for moving receptacles, means for feeding receptacles to said first means, a solid shaft extending through said hollow shaft, a turret having measuring cups connected to said solid shaft, a plate sealing the bottoms of said cups and provided with a discharge opening for emptying same into receptacles, and means actuated by a receptacle for clutching said hollow and solid shafts together to thus advance said turret to register a filled cup with said discharge opening whereby the contents of said cup are deposited into said receptacle.

6. A receptacle filling machine comprising a hopper for material to be packaged, a main hollow shaft continuously rotating when said machine is in operation, means on said shaft for moving receptacles, means for feeding receptacles to said first means, a solid shaft extending through said hollow shaft, a turret having measuring cups connected to said solid shaft, a plate sealing the bottoms of said cups and provided with a discharge opening for emptying same into receptacles, a star wheel on said hollow shaft, a third shaft rotatively connected with said solid shaft, a star wheel on said third shaft, means for normally holding said star wheels out of engagement, and means actuated by a receptacle for engaging said star wheels to clutch said hollow and solid shafts together to thus advance said turret to register a filled cup with said discharge opening whereby the contents of said cup are deposited into said receptacle.

7. A receptacle filling machine comprising a hopper for material to be packaged, a flexible guard around the outlet of said hopper, a main hollow shaft continuously rotating when said machine is in operation, means on said shaft for moving receptacles, means for feeding receptacles to said first means, a solid shaft extending through said hollow shaft, a turret having measuring cups connected to said solid shaft, a plate sealing the bottoms of said cups and provided with a discharge opening for emptying same into receptacles, and means actuated by a receptacle for clutching said hollow and solid shafts together to thus advance said turret to register a filled cup with said discharge opening whereby the contents of said cup are deposited into said receptacle.

8. A receptacle filling machine comprising a hopper for material to be packaged, a flexible guard around the outlet of said hopper, a main hollow shaft continuously rotating when said machine is in operation, means on said shaft for moving receptacles, means for feeding receptacles to said first means, a solid shaft extending through said hollow shaft, a turret having measuring cups connected to said solid shaft, a plate sealing the bottoms of said cups and provided with a discharge opening for emptying same into receptacles, a star wheel on said hollow shaft, a third shaft rotatively connected with said solid shaft, a star wheel on said third shaft, means for normally holding said star wheels out of engagement, and means actuated by a receptacle for engaging said star wheels to clutch said hollow and solid shafts together to thus advance said turret to register a filled cup with said discharge opening whereby the contents of said cup are deposited into said receptacle.

9. A receptacle filling machine comprising a hopper for material to be packaged, a main hollow shaft continuously rotating when said machine is in operation, means on said shaft for moving receptacles, means for feeding receptacles to said first means, a solid shaft extending through said hollow shaft, a turret having measuring cups connected to said solid shaft, revolving fingers for settling the material in the cups and removing whole objects from the top thereof, means for directing the material wiped from said filled cup into empty cups, a plate sealing the bottoms of said cups and provided with a discharge opening for emptying same into receptacles, and means actuated by a receptacle for clutching said hollow and solid shafts together to thus advance said turret to register a filled cup with said discharge opening whereby the contents of said cup are deposited into said receptacle.

10. A receptacle filling machine comprising a hopper for material to be packaged, a main hollow shaft continuously rotating when said machine is in operation, means on said shaft for moving receptacles, means for feeding receptacles to said first means, a solid shaft extending through said hollow shaft, a turret having measuring cups connected to said solid shaft, revolving fingers for settling the material in the cups and removing whole objects from the top thereof, means for directing the material wiped from said filled cup into empty cups, a plate sealing the bottoms of said cups and provided with a discharge opening for emptying same into receptacles, a star wheel on said hollow shaft, a third shaft rotatively connected with said solid shaft, a star wheel on said third shaft, means for normally holding said star wheels out of engagement, and means actuated by a receptacle for engaging said star wheels to clutch said hollow and solid shafts together to thus advance said turret to register a filled cup with said discharge opening whereby the contents of said cup are deposited into said receptacle.

11. A receptacle filling machine comprising a hopper for material to be packaged, a flexible guard around the outlet of said hopper, a main hollow shaft continuously rotating when said machine is in operation, means on said shaft for moving receptacles, means for feeding receptacles to said first means, a solid shaft extending through said hollow shaft, a turret having measuring cups connected to said solid shaft, revolving flexible fingers for settling the material in the cups and removing whole objects from the top thereof, guides for directing the material wiped from said filled cup into empty cups, a plate sealing the bottoms of said cups and provided with a discharge opening for emptying same into receptacles, and means actuated by a receptacle for clutching said hollow and solid shafts together to thus advance said turret to register a filled cup with said discharge opening whereby the contents of said cup are deposited into said receptacle.

12. A receptacle filling machine comprising a hopper for material to be packaged, a flexible guard around the outlet of said hopper, a main hollow shaft continuously rotating when said machine is in operation, means on said shaft for moving receptacles, means for feeding receptacles to said first means, a solid shaft extending through said hollow shaft, a turret having measuring cups connected to said solid shaft, revolving flexible fingers for settling the material in the cups and removing whole objects from the top thereof, guides for directing the material wiped from said filled cup into empty cups, a plate sealing the bottoms of said cups and provided with a discharge opening for emptying same into receptacles, a star wheel on said hollow shaft, a third shaft rotatively connected with said solid shaft, a star wheel on said third shaft, means for normally holding said star wheels out of engagement, and means actuated by a receptacle for engaging said star wheels to clutch said hollow and solid shafts together to thus advance said turret to register a filled cup with said discharge opening whereby the contents of said cup are deposited into said receptacle.

13. A receptacle filling machine comprising a hopper for material to be packaged, measuring cups movable along a fixed path for receiving material from said hopper, a guard comprising a strip of flexible material associated with the discharge end of the hopper and forming therewith an opening through which material is directed into said cups, the guard being movable by excess material, whereby said excess material may pass beyond the guard and opening, means directing said excess material into open cups, and a plate sealing the bottoms of the cups during filling and provided with a discharge opening for depositing material from said filled cups.

CHARLES H. AYARS.